United States Patent
Sirok et al.

(10) Patent No.: US 10,202,288 B2
(45) Date of Patent: Feb. 12, 2019

(54) CAVITATION DEVICE FOR TREATMENT OF WATER BY CAVITATION

(71) Applicant: SiEVA d.o.o.—POSLOVNA ENOTA IDRIJA, Idrija (SI)

(72) Inventors: Branko Sirok, Vrhnika (SI); Matevz Dular, Ljubljana (SI); Martin Petkovsek, Ljubljana (SI)

(73) Assignee: SIEVA D.O.O., Idrija (SI)

( * ) Notice: Subject to any disclaimer, the term of this patent is extended or adjusted under 35 U.S.C. 154(b) by 299 days.

(21) Appl. No.: 15/049,409

(22) Filed: Feb. 22, 2016

(65) Prior Publication Data

US 2016/0167983 A1 Jun. 16, 2016

Related U.S. Application Data

(63) Continuation of application No. PCT/EP2014/002273, filed on Aug. 19, 2014.

(51) Int. Cl.
*B01F 7/00* (2006.01)
*C02F 1/34* (2006.01)

(52) U.S. Cl.
CPC ............ *C02F 1/34* (2013.01); *B01F 7/00758* (2013.01); *B01F 7/00775* (2013.01); *B01F 7/00791* (2013.01); *C02F 2201/003* (2013.01)

(58) Field of Classification Search
CPC .... B01F 7/0075; B01F 7/008; B01F 7/00808; B01F 7/00816; B01F 7/00833;

(Continued)

(56) References Cited

U.S. PATENT DOCUMENTS

| 32,250 | A | * | 5/1861 | Jackson et al. | ..... B01F 7/00766 366/304 |
| 311,626 | A | * | 2/1885 | Wilson | ................ B01F 7/00758 241/157 |

(Continued)

FOREIGN PATENT DOCUMENTS

| EP | 1780177 A2 | 5/2007 |
| EP | 2228134 A2 | 9/2010 |

(Continued)

OTHER PUBLICATIONS

Martin Petkovsek, Mojca Zupanc, Matevz Dular, Tina Kosjek, Ester Heath, Boris Kompare, Brane Sirok, "Rotation Generator of Hydrodynamic Cavitation for Water Treatment", Separation and Purification Technology, vol. 118, Jul. 31, 2013 (Jul. 31, 2013), pp. 415-423.

(Continued)

*Primary Examiner* — Charles Cooley
(74) *Attorney, Agent, or Firm* — Myers Wolin, LLC

(57) ABSTRACT

A cavitation device is provided for use in a method for the treatment of water by cavitation. The water to be treated passes through an annular cavitation zone which exists between two mutually opposite annular structures which rotate relative to one another and which have teeth directed substantially axially towards one another. Here, the water flows along cavitation surfaces which are provided on the face sides of the teeth of a first of the two annular structures and which are inclined in the circumferential direction such that, viewed in the relative direction of rotation of the other, second annular structure, the spacings between said teeth and said second annular structure increase.

13 Claims, 2 Drawing Sheets

(58) Field of Classification Search
CPC .......... B01F 7/00358; B01F 2215/0431; B01F 7/00775; B01F 7/00791; B01F 7/00758; B01F 7/00766; B01F 7/0085; B01F 7/00858; B01F 7/00866; B01F 7/00875; C02F 1/34; C02F 2201/003
USPC .......................... 366/286, 302, 304, 305, 306
See application file for complete search history.

(56) References Cited

U.S. PATENT DOCUMENTS

| | | | | | |
|---|---|---|---|---|---|
| 1,624,037 | A | * | 4/1927 | Butler | B01F 7/00758 209/191 |
| 2,591,966 | A | * | 4/1952 | Rider | B02C 2/10 241/259 |
| 3,514,079 | A | * | 5/1970 | Little, Jr. | B01F 7/00816 241/261.1 |
| 5,042,726 | A | * | 8/1991 | Reinhall | B01F 7/00758 241/28 |
| 5,632,596 | A | * | 5/1997 | Ross | B01F 7/00758 241/261 |
| 5,692,829 | A | * | 12/1997 | Chiappa | A23G 1/10 366/303 |
| 6,059,444 | A | * | 5/2000 | Johnson | B01F 15/00032 366/172.1 |
| 6,224,826 | B1 | | 5/2001 | Katakura et al. | |
| 6,241,472 | B1 | * | 6/2001 | Bosch | B01F 7/00766 366/305 |
| 7,507,014 | B1 | * | 3/2009 | League | B01F 7/00816 366/172.1 |
| 7,887,862 | B2 | * | 2/2011 | Paz Briz | A23F 5/02 209/199 |
| 8,851,741 | B2 | * | 10/2014 | Ganmor | A01N 65/00 366/171.1 |
| 9,776,159 | B2 | * | 10/2017 | Kozyuk | B01J 19/008 |
| 2011/0095111 | A1 | * | 4/2011 | Briz | A23F 5/02 241/46.17 |
| 2012/0093906 | A1 | * | 4/2012 | Ganmor | A01N 65/00 424/405 |
| 2012/0291765 | A1 | | 11/2012 | Griggs | |
| 2016/0167983 | A1 | * | 6/2016 | Sirok | C02F 1/34 422/127 |
| 2016/0175791 | A1 | * | 6/2016 | Kozyuk | B01F 7/00816 366/118 |
| 2016/0325255 | A1 | * | 11/2016 | Parker | B01J 8/16 |
| 2017/0007976 | A1 | * | 1/2017 | Kozyuk | B01J 19/008 |
| 2017/0028375 | A1 | * | 2/2017 | Kozyuk | B01J 19/008 |

FOREIGN PATENT DOCUMENTS

| | | |
|---|---|---|
| UA | 2657 U | 9/2007 |
| WO | WO-9633008 A1 * 10/1996 | .......... B01F 7/00775 |
| WO | 2007076579 A1 | 7/2007 |

OTHER PUBLICATIONS

International Search Report with Written Opinion, dated Nov. 24, 2014, for corresponding international application PCT/EP2014/002273.

* cited by examiner

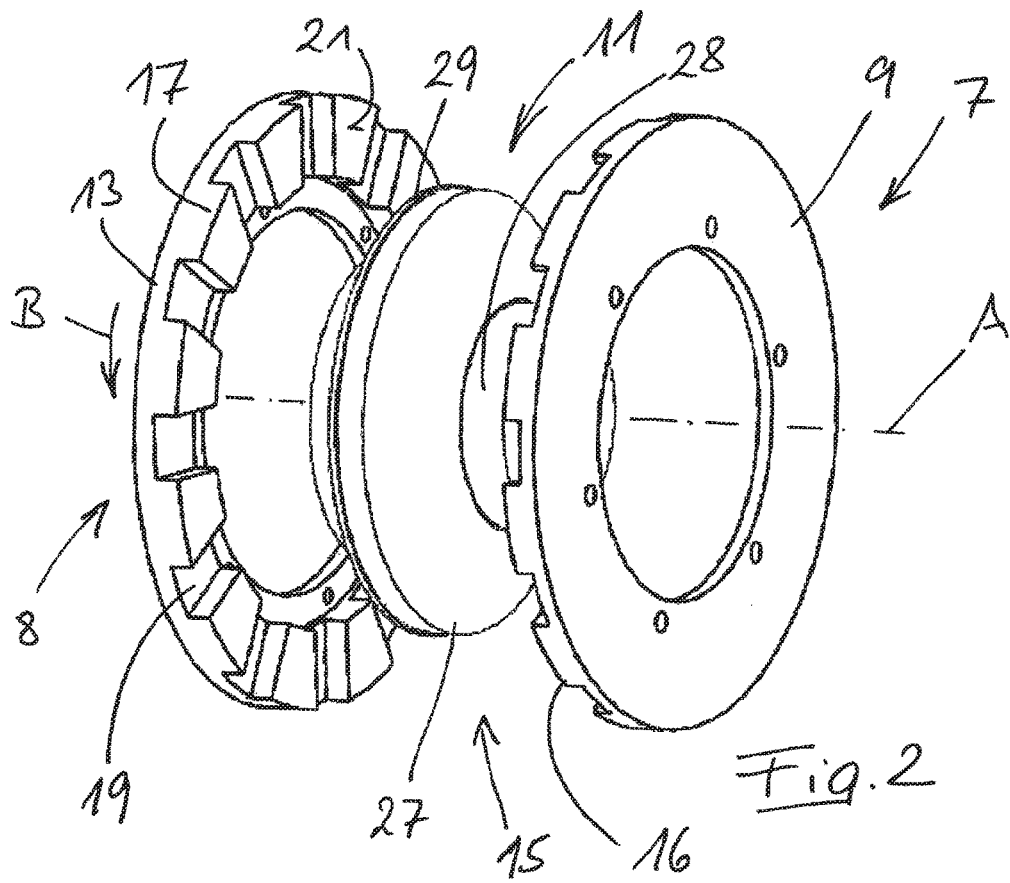
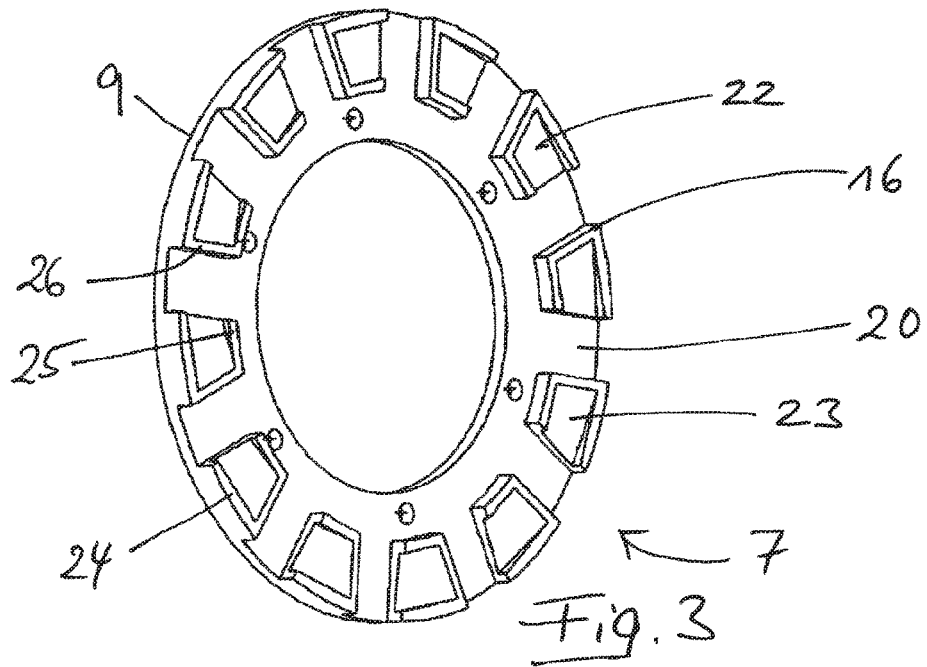

CAVITATION DEVICE FOR TREATMENT OF WATER BY CAVITATION

CROSS REFERENCE TO RELATED APPLICATIONS

This application is a continuation under 35 U.S.C. § 120 of International Application PCT/EP2014/002273, filed Aug. 19, 2014, which claims priority to German Application 10 2013 013 813.2, filed Aug. 22, 2013, the contents of each of which are incorporated by reference herein.

FIELD OF THE INVENTION

The present invention relates to a cavitation device designed and suitable for use in a process for treatment of water by cavitation.

BACKGROUND

Aspects of environmental protection are becoming increasingly important on a global scale. An important aspect among those is the purification of wastewaters from households, industry and trade.

Such wastewaters may be polluted with diverse noxious materials. Accordingly, several different treatment methods are available, which in principle can be subdivided into mechanical, physical, biological and chemical methods. In connection with the treatment of water, especially wastewater, proposals already exist concerning the use of cavitation for destruction of noxious organic substances. The underlying concept is that the intense pressure pulsations occurring during cavitation and associated with extreme pressure peaks destroy organic substances or compounds or break them apart so that they can be extensively degraded with further treatment methods. Proposals to this effect, on using cavitation devices for purification of water, are described, for example, in WO 2007/076579 A1, EP 1780177 A2 and U.S. Pat. No. 6,224,826 B1.

Furthermore, the article of Martin Petkovsek et al. "Rotation Generator of Hydrodynamic Cavitation for Water Treatment" (Separation and Purification Technology, 2013) deals with the use of cavitation for removal of pharmaceutical resides from water. It proposes and investigates a cavitation device of the class in question according to the preamble of claim 1: This has two rotors, which are mounted in a housing, rotate coaxially in opposite directions and are equipped with projections disposed opposite one another and forming a slit. A water inlet and (disposed opposite) a water outlet open laterally into the housing. Influences of additives (hydrogen peroxide) and of process parameters (temperature) are illustrated in the publication. In one of the investigated embodiments, the end faces of the projections of one of the two rotors are chamfered in circumferential direction to the effect that the slit width relative to the projections of the second rotor is increased counter to the direction of rotation of the rotor in question.

EP 2228134 A2 discloses a device used for the treatment of liquid wherein cavitation effects are also used in connection with collection, purification and homogenization (e.g. with the objective of improving the combustion of a liquid fuel). The device comprises a flow-through housing provided with a liquid inlet and a liquid outlet, in which a disk (rotor) driven in rotation is disposed with axially oriented projections. The projections of the rotor are disposed on one or more circles. They are disposed opposite either the end wall of the housing or a second disk mounted therein and rotating in opposite direction, wherein axially oriented projections may be disposed on coaxial circles on the end wall of the housing or on the second disk. The projections of the rotor and the projections provided on the end wall of the housing or on the second disk overlap one another in axial direction and in addition are disposed in "gap-forming" manner, such that the projections of the rotor disposed on one circle respectively penetrate into an annular intermediate space that exists between two neighboring circles of projections of the end wall of the housing or of the second disk. The situation is analogous for the projections disposed on the end wall of the housing or on the second disk. The rotating second disk may then be mounted on a rotating pipe, which forms the liquid inlet.

Heretofore the cavitation of water in order to treat it has not been used on the industrial scale. Obviously no process has yet existed that can be used industrially under aspects of reliability, effectiveness or efficiency and other aspects of practical relevance.

The object of the present invention is to provide a cavitation device, which is appropriate for treatment of water by cavitation and which is suitable for industrial service, especially by the fact that efficient treatment of water by means of cavitation is possible on an industrial scale using the cavitation device.

SUMMARY

The object stated in the foregoing is achieved according to the present invention by the cavitation device specified in the claims. This comprises a housing with a water inlet, a water outlet and a cavity extending between them as well as two annular structures, which are disposed opposite one another in the cavity and a first part of which is a non-rotating stator and the other, second part is a rotor driven in rotation. The two annular structures are provided with teeth axially oriented in substantially opposite directions and they define between them an annular cavitation zone, which can be flowed through from inside to outside, by the fact that the water inlet and the water outlet are respectively in fluidic communication with a region of the cavity disposed radially inside the cavitation zone and with a region of the cavity disposed radially outside the cavitation zone. At the end face, on the teeth of one of the two annular structures, preferably the non-rotating first annular structure, cavitation surfaces are provided that are inclined in circumferential direction in such a way that, viewed in relative direction of rotation of the other, preferably rotating second annular structure, they increase their spacing relative to the latter. The toothing provided at the end face on the second annular structure (moving in rotation relative to the first annular structure) moves the water present in the cavitation zone actively with predetermined velocity over the cavitation faces of the first annular structure. For typical sizes, the speed of the rotating annular structure of between 1000 and 3000 rpm, for example, is suitable for this purpose.

In radially outward direction, the cavitation surfaces are embraced by outer guide ridges, which in circumferential direction maintain a substantially constant spacing relative to the second annular structure. Preferably this said spacing of the outer guide ridges relative to the second annular structure should be kept to a minimum, for example only a few millimeters thick or even smaller if possible. The guide ridges contribute to a directed flow of the water along the cavitation surfaces; they reduce the danger of a "short circuit" between the radially inner and radially outer region of the cavity in substantially radial direction. Furthermore, they constitute a kind of barrier or "seal" of the cavitation surfaces relative to the region of the cavity disposed radially outside the cavitation zone (for example, in communication with the water outlet), so that the pressure conditions prevailing there and the pressure conditions in the region of the cavitation surfaces are decoupled from one another to a certain extent. Based on the same considerations, the cavitation surfaces are also embraced in radially inward direction by inner guide ridges, which in circumferential direction maintain a substantially constant spacing relative to the second annular structure. Such inner guide ridges decouple, to a certain extent, the pressure conditions in the region of the cavity disposed radially inside the annular zone (for example, in communication with the water inlet) on the one hand and in the region of the cavitation surfaces on the other hand. It is particularly advantageous when the outer and the inner guide ridges are part of U-shaped pockets embracing the cavitation surfaces.

By the fact that, according to the invention, the water inlet and the water outlet of the inventive cavitation device are respectively in communication with a region of the cavity disposed radially inside the cavitation zone and with a region of the cavity disposed radially outside the cavitation zone, so that the cavitation zone (with a movement component in circumferential direction) is flowed through from inside to outside communicate, the fluidic effects occurring inside the cavitation zone support the transport of the water to be treated through the cavitation device. Notwithstanding this, and independently of it, the cavitation device, according to a preferred improvement, is provided with a pump stage, which transports the water through the cavitation zone. Preferably the pump stage is disposed on the feed side, i.e. between the water inlet and the cavitation zone. Subject to certain prerequisites, however, a pump stage disposed on the discharge side, between the cavitation zone and the water outlet, where its suction effect may be capable of supporting or amplifying the cavitation effects in the cavitation zone, may also prove advantageous.

With the inventive cavitation device, relatively large throughputs of water can be subjected effectively and efficiently to treatment by cavitation, wherein the corresponding cavitation device can be of relatively compact construction. A contributing factor in this respect is that the annular cavitation zone is flowed through from inside to outside, wherein one of the two annular structures defining the cavitation zone is designed to be rotating while the other annular structure is designed to be non-rotating. Thus the resulting fluidic effects occurring inside the cavitation zone support the transport of the water to be treated through the cavitation device. By application of the cavitation device constructed in such a way, industrial implementation of the inventive process (see above) is possible with relatively low equipment-related expense. It is not particularly important for this purpose whether the first annular structure, provided with the cavitation surfaces, rotates, i.e. is part of a rotor, or else—as part of a stator—does not rotate; both embodiments merit consideration and have their specific advantages in applications engineering.

Furthermore, as a special aspect of efficiency, it must be emphasized that the cavitation device not only works with relatively small power consumption but also has a long useful life, since the mode of operation and the design (adapted thereto) of the cavitation device reduce the risk of damage to the rotor and stator precisely by the cavitation. One decisive aspect in this regard can be seen in the fact that, according to the present invention, the generation of cavitation—by creating local reduced pressure with high pressure gradients—relies specifically on cavitation surfaces, which are disposed on the end faces of teeth provided on a first of the annular structures, oriented toward the other annular structure and inclined in circumferential direction, and over which the water is moved by the action of the other, second annular structure rotating relative to the first annular structure, wherein the cavitation surfaces increase their spacing relative to the second annular structure in the circumferential direction of movement of the second annular structure relative to the first annular structure. By the fact that water is moved at high velocity over the cavitation surfaces of the first annular structure under the action of the second annular structure, which is also provided with a toothing on the end face disposed opposite the toothing of the first annular structure, a local reduced pressure (with a steep pressure gradient) is produced in this way, leading to cavitation.

For typical applications, this pitch of the cavitation surfaces in circumferential direction is preferably between 2° and 10°. In such a configuration, the desired effects (cavitation) develop to such an extent that efficient treatment of the water is possible without simultaneously creating an unacceptably large risk of damaging the cavitation device by the resulting pressure pulsations. This is, as explained, an advantageous dimension for typical applications. Depending on the kind of substance to be destroyed or degraded by means of cavitation effects, different inclinations or pitches of the cavitation surfaces are advantageous under certain circumstances. Otherwise the individual cavitation surfaces disposed on the toothing of an annular structure may also be inclined (or angled) differently. Hereby the bandwidth of the treatment of water can be broadened with respect to different noxious substances and in addition the risk of harmful resonances capable of impairing the useful life can be reduced. With the same objective of preventing or reducing resonance effects, it is favorable when the individual teeth of the first and/or of the second annular structure are differently dimensioned in circumferential direction and/or when the two annular structures are provided with different numbers of teeth.

A preferred improvement of the inventive cavitation device is characterized in that the axial spacing of the two annular structures—defining the annular cavitation zone—is mutually adjustable. Hereby the cavitation device is adaptable with simple means to different tasks and requirements, since under otherwise equal boundary conditions the gradient of the local pressure pulsations inside the cavitation zone depends on the spacing that the annular structures maintain relative to one another.

Preferably flow channels extending over the radial extent of the cavitation zone are disposed at least between the teeth of the second annular structure. Via the said flow channels, which particularly preferably are open toward the regions of the cavity adjoining the cavitation zone without notable narrowing of the cross section, the region of the cavity disposed inside the cavitation zone is in communication with the region of the cavity disposed outside the cavitation zone. Such flow channels prove to be particularly advantageous with respect to the reliability of the inventive cavitation device among other aspects, since foreign bodies are able to pass through them from that region of the cavity associated with the water inlet to that region of the cavity associated with the water outlet. Thus foreign bodies with dimensions larger than the minimum slit width or minimum spacing between the two annular structures in the region of the annular cavitation zone do not cause damage to the cavitation device. This benefits the efficiency, as a result of the increased operating safety. More or less pronounced flow channels may also be disposed between the teeth (provided with the cavitation surfaces) of the first annular structure.

According to yet another preferred improvement of the present invention, the cavitation surfaces increase their spacing relative to the second annular structure in radial direction corresponding to the flow direction of the cavitation zone. In this sense, the cavitation surfaces preferably (also) increase their spacing relative to the second annular structure in radially outward direction in the cavitation zone being flowed through from inside to outside (see above) according to the invention. This is advantageous under aspects of efficiency. Angles between 2° and 10° are also favorable—for typical applications—for the corresponding inclination or pitch of the cavitation surfaces in radial direction.

According to yet another preferred improvement of the invention, the (rotating) rotor annular structure is constructed as a rotor annular disk, which is mounted on a support structure driven in rotation by a motor and disposed in the cavity. In corresponding manner, the stator preferably comprises a stator annular disk, which is mounted on a housing portion. This favors individual adaptation of the cavitation device to different tasks and requirements by simple replacement of the rotor annular disk and/or the stator annular disk. The above-mentioned support structure can then be constructed in particular as a flow-through, central water-guiding body, which is provided with a radial outlet slit, which is substantially aligned with the slit existing between the annular structures. In a suitable configuration, a pump stage (see above) may also be implemented in the central water-guiding body, thus ensuring efficient feed of the water to be treated into the cavitation zone that is crucial for this purpose between the two annular structures.

The inventive cavitation device may be constructed if necessary in multiple stages, wherein the flow passes successively through one or more stages in the manner of a cascade. In this case, the water outlet of the preceding stage is in fluidic communication with the water inlet of the following stage.

Furthermore, according to yet another preferred embodiment of the invention, the cavitation device may be provided with a throttling device, by means of which the flow through the cavitation device can be varied or selectively adjusted. In this way the dwell time of the water in the cavitation zone can be adjusted and in this way adapted in particular to the degree of pollution or contamination with noxious substances.

BRIEF DESCRIPTION OF THE DRAWINGS

The present invention will be explained in more detail hereinafter on the basis of a preferred exemplary embodiment illustrated in the drawing, wherein FIG. 2 shows the first and second annular structures defining the cavitation zone of the cavitation device according to FIG. 1 together with the rotor support structure, and FIG. 3 shows the first annular structure of the cavitation device according to FIG. 1 from the toothing side.

DETAILED DESCRIPTION OF THE PREFERRED EMBODIMENTS

Figure 1:
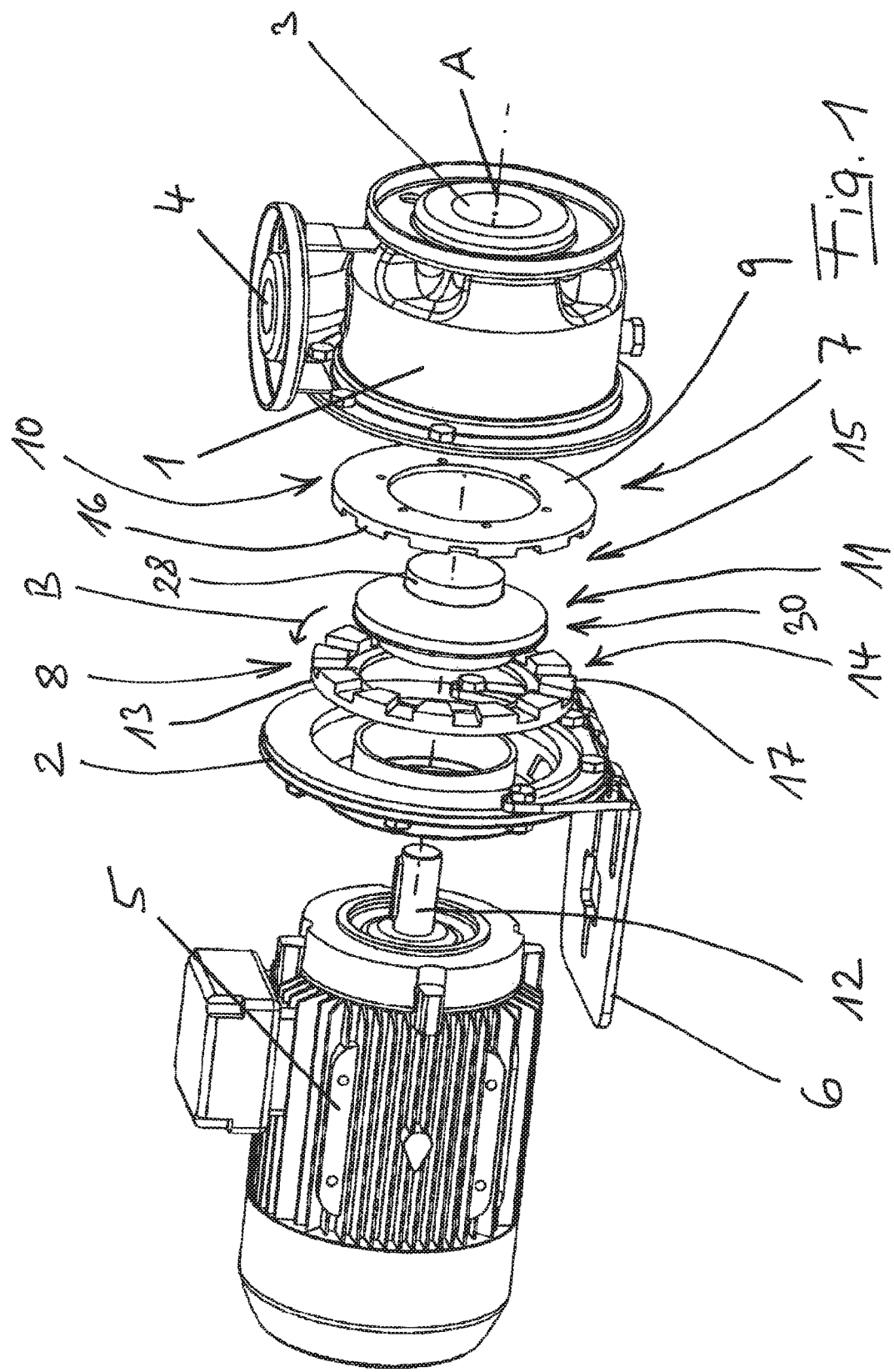
FIG. 1 shows, in an exploded diagram, a cavitation device that constructively implements the present invention.

An article written by Martin Petkovsek et al. "Rotation Generator of Hydrodynamic Cavitation for Water Treatment" (Separation and Purification Technology, 2013) deals with the use of cavitation for removal of pharmaceutical resides from water. It proposes and investigates a cavitation device of the class discussed above and disclosed herein: The disclosed structure has two rotors, which are mounted in a housing, rotate coaxially in opposite directions and are equipped with projections disposed opposite one another and forming a slit. A water inlet and (disposed opposite) a water outlet open laterally into the housing. Influences of additives (hydrogen peroxide) and of process parameters (temperature) are illustrated in the publication. In one of the investigated embodiments, the end faces of the projections of one of the two rotors are chamfered in circumferential direction to the effect that the slit width relative to the projections of the second rotor is increased counter to the direction of rotation of the rotor in question.

The cavitation device illustrated in the drawing comprises a housing, which encloses a cavity and is constructed in two parts in such a way that it has a housing shell 1 and a housing cover 2 that can be sealed tightly therewith. A water inlet 3 and a water outlet 4, both in communication with the cavity, are provided on housing shell 1. An electric motor 5 is flanged onto housing cover 2. Furthermore, a mounting retainer 6 is joined to housing cover 2.

A first annular structure 7 and a second annular structure 8 are disposed opposite one another in the cavity. First annular structure 7 is fixed—in axially adjustable manner—on the inside on housing shell 1; it forms a stator annular structure 10 constructed as a stator annular disk 9. In contrast, second annular structure 8 is joined to a rotor support structure 11, which in turn is joined to motor shaft 12 (which projects into the cavity and rotates around axis A); accordingly it represents a rotor annular structure 14, which is constructed as rotor annular disk 13 and which rotates (arrow B) relative to first annular structure 7.

First and second annular structures 7 and 8, which together define an annular cavitation zone 15, which is disposed to be in fluidic communication between water inlet 3 and water outlet 4 and is flowed through from inside to outside, are provided with teeth 16 and 17 respectively, which are axially oriented in substantially opposite directions. Flow channels 19, which extend over the radial extent of cavitation zone 15 and open radially outward into that region of the cavity which is in direct communication with water outlet 4, are disposed between the teeth 17 of second annular structure 8. First annular structure 7 is also provided with flow channels 20 disposed between teeth 16 respectively adjacent to one another.

End faces 21 of teeth 17 of second, rotating annular structure 8 are disposed in a plane oriented perpendicular to axis A. In contrast, end faces 22 of teeth 16 of first, non-rotating annular structure 7 comprise cavitation surfaces 23 inclined in circumferential direction as well as in radial direction. These cavitation surfaces 23 are inclined (angled) in such a way that their spacing relative to second annular structure 8 increases both in circumferential direction in direction of rotation B of second annular structure 8 and respectively in radial direction from inside to outside; this angle (pitch) in circumferential direction is approximately 6°. Cavitation surfaces 23 are embraced radially outside by outer guide ridges 24 and radially inside by inner guide ridges 25, which respectively maintain a substantially constant spacing in circumferential direction relative to second annular structure 8 and are respectively part of U-shaped pockets 26 embracing cavitation surfaces 23 on three sides.

Rotor support structure 11 disposed radially inside cavitation zone 15 in the cavity is constructed as a flow-through central water-guiding body 27. This is provided with an inlet nozzle 28, which is aligned with water inlet 3 of the housing, as well as with a radial outlet slit 29, which is substantially aligned with the slit existing between the two annular structures 7 and 8. Rotating water-guiding body 27 functions—in the manner of a radial pump—as pump stage 30, which transports the water actively from inside to outside through cavitation zone 15.

What is claimed is:

1. A cavitation device for use in a process for treatment of water by cavitation, comprising:
    a housing with a water inlet (3), a water outlet (4) and a cavity extending between the water inlet and the water outlet as well as two annular structures (7, 8), which are disposed opposite one another in the cavity and which are provided with teeth (16, 17) axially oriented in substantially opposite directions and which define an annular cavitation zone (15),
    wherein, at the end face, on the teeth (16) of one of the two annular structures (7, 8), cavitation surfaces (23) are provided that are inclined relative to a reference plane perpendicular to a rotational axis of the corresponding annular structure in a circumferential direction relative to a circumference of the corresponding annular structure in such a way that, viewed in relation to a direction of rotation (B) of the other annular structure (8, 7), the cavitation surfaces increase their spacing relative to the other annular structure;
    wherein the cavitation zone (15) can be flowed through from inside to outside, by the fact that the water inlet (3) and the water outlet (4) are respectively in fluidic communication with a region of the cavity disposed radially inside the cavitation zone (15) and with a region of the cavity disposed radially outside the cavitation zone,
    wherein the cavitation surfaces are provided with outer guide ridges radially outside the corresponding cavitation surface and inner guide ridges radially inside the corresponding cavitation surface which maintain a substantially constant spacing relative to the other annular structure.

2. The cavitation device of claim 1, wherein a first of the two annular structures is part of a non-rotating stator and a second of the two annular structures is part of a rotor driven in rotation, and wherein the cavitation surfaces (23) are provided on the teeth (16) of the non-rotating first annular structure (7).

3. The cavitation device of claim 1, wherein a pump stage (30), which transports the water through the cavitation zone (15), is provided in the cavity.

4. The cavitation device of claim 1, wherein the axial spacing of the two annular structures (7, 8) is mutually adjustable.

5. The cavitation device of claim 1, wherein flow channels (19, 20) extending over a radial extent of the cavitation zone (15) are disposed at least between the teeth (17) of one of the two annular structures (7, 8).

6. The cavitation device of claim 5, wherein the flow channels (19) are open toward regions of the cavity adjoining the cavitation zone (15) without narrowing of the cross section.

7. The cavitation device of claim 1, wherein the cavitation surfaces (23) increase their spacing relative to the other annular structure in radial direction corresponding to the flow direction of the cavitation zone (15).

8. The cavitation device of claim 1, wherein the outer and inner guide ridges (24, 25) are part of U-shaped pockets (26) embracing the cavitation surfaces on three sides.

9. The cavitation device of claim 1, wherein the pitch of the cavitation surfaces (23) in circumferential direction is between 2° and 10°.

10. The cavitation device of claim 1, wherein the two annular structures (7, 8) are provided with different numbers of teeth (16, 17).

11. The cavitation device of claim 1, wherein the teeth (16, 17) of at least one of the two annular structures (7, 8) are constructed differently from one another.

12. The cavitation device of claim 1, wherein the teeth of the two annular structures are located at equivalent locations radially on their corresponding annular structures such that they face each other.

13. A cavitation device for use in a process for treatment of water by cavitation, comprising:
    a housing with a water inlet (3), a water outlet (4) and a cavity extending between the water inlet and the water outlet as well as two annular structures (7, 8), which are disposed opposite one another in the cavity and which are provided with teeth (16, 17) axially oriented in substantially opposite directions and which define an annular cavitation zone (15),
    wherein, at the end face, on the teeth (16) of one of the two annular structures (7, 8), cavitation surfaces (23) are provided that are inclined relative to a reference plane perpendicular to a rotational axis of the corresponding annular structure in a circumferential direction relative to a circumference of the corresponding annular structure in such a way that viewed in relation to a direction of rotation (B) of the other annular structure (8, 7), the cavitation surfaces increase their spacing relative to the other annular structure;
    wherein the cavitation zone (15) can be flowed through from inside to outside, by the fact that the water inlet (3) and the water outlet (4) are respectively in fluidic communication with a region of the cavity disposed radially inside the cavitation zone (15) and with a region of the cavity disposed radially outside the cavitation zone,
    wherein the rotor annular structure (14) is constructed as a rotor annular disk (13), which is mounted on a rotor support structure (11) driven in rotation by a motor (5) and disposed in the cavity, and
    wherein the rotor support structure (11) is constructed as a flow-through, central water-guiding body (27), which is provided with a radial outlet slit (29), which is substantially aligned with the slit existing between the two annular structures (7, 8).

* * * * *

UNITED STATES PATENT AND TRADEMARK OFFICE
CERTIFICATE OF CORRECTION

PATENT NO. : 10,202,288 B2
APPLICATION NO. : 15/049409
DATED : February 12, 2019
INVENTOR(S) : Branko Sirok, Matevz Dular and Martin Petkovsek It is certified that error appears in the above-identified patent and that said Letters Patent is hereby corrected as shown below:

On the Title Page

Item (30), please insert:
--Foreign Application Priority Data
August 22, 2013 (DE) ..................... 10 2013 013 813.2--

Signed and Sealed this
Second Day of April, 2019

Andrei Iancu
*Director of the United States Patent and Trademark Office*